3,084,046
PROCESS FOR OLEAGINOUS SEED
Robert A. Johnson, San Jose, and Patricia T. Anderson, San Mateo, Calif., assignors to Food Techniques, Inc., San Jose, Calif., a corporation of California
No Drawing. Filed July 16, 1959, Ser. No. 827,429
2 Claims. (Cl. 99—2)

This invention relates to a process for removing toxic properties of gossypol from vegetable seeds.

Cotton seeds in particular have a toxic material known as gossypol or its related compounds gossypurpurin, gossycaerulin and gossyfulvin. These materials appear in discrete pigmented glands which are distributed through the kernel of the seeds. The gossypol itself is a bright yellow pigment and is toxic to non-ruminant animals such as chickens and other poultry and swine.

In the case of egg laying poultry the gossypol in the poultry feed will cause yolk discoloration and the retardation of growth of baby chickens.

It has been found that cotton seed meal containing up to 0.03% of free gossypol can be safely fed to swine. However, there are indications that if the free gossypol percentage in feed for laying hens approximates 0.008% that yolk discoloration begins and if the percentage is 0.012% or greater the egg hatchability is definitely lower. It has also been found that feed containing free gossypol at levels less than 0.014% will not hamper the growth of baby chickens.

Cotton seed and other oleaginous seeds are treated to remove the valuable seed oils from the seeds leaving a residual press cake which is high in protein but which contains sufficient gossypol so that the press cake is not suitable as a feed for non-ruminant animals.

The principal object of this invention is to provide a method for destroying the toxic properties of the gossypol within cotton seed and other similar oleaginous seed meats or press cakes so that the press cakes or seed meats are suitable for direct feeding to non-ruminant animals such as chickens, swine and other poultry.

A feature and advantage of this invention is that the process may be used with the resultant press cake resulting after the process for removal of oil from the seeds by either hydraulic pressing, screw pressing or solvent extraction or a combination of these methods.

A further object of this invention is to reduce the toxic effect of the gossypol within seed meats by the major reduction of free gossypol so that the available gossypol units (AGU) are reduced to a level below the recognized safe level for feeding the seed meats to laying hens and swine.

The AGU is determined by the analysis of egg yolks fed to laying hens in a process developed by Dr. C. R. Grau and co-workers at the University of California. Dr. Grau reports that cotton seed meals containing 0.30 AGU or less may be fed to laying hens in amounts up to 10% by weight of the total ration without any mottling or objectionable discoloration effects to the egg yolks.

The AGU is directly related to the percentage of free gossypol and is far less effected by the bound gossypol within the seed.

Another object of this invention is to prepare a press cake or extracted meal of seed meats in which the toxic effect of the gossypol within the meal is sufficiently reduced so that it may be fed to non-ruminant animals in amounts necessary to supply the animals with necessary protein requirements without any harmful effects.

Another object of this invention is to provide a process for the preparation of oleaginous seed meals or extracted or pressed meals from oleaginous seeds having an absence of free or combined gossypol constituents and having a more readily assimilable protein biologically and having better color characteristics than the original meal.

A still further object of this invention is to provide a process of treating oleaginous seed meals or extracted or pressed meals from oleaginous seeds by treatment of the meal or meats with sodium hydroxide followed by subsequent treatment with either hydrogen peroxide or hydrochloric acid.

Other objects of the present invention will become apparent upon reading the following specification and examples included therein.

In the principal embodiment of this invention bar hulled oleaginous seed meats such as cotton seed meats or partially or fully expelled or extracted seed cakes are fed into a continuous steam jacketed blender of the ribbon or thermoscrew type.

The meal or meats are then sprayed with 2.5% aqueous solution of sodium hydroxide to obtain a pH of approximately 10.5. It has been found that if the 2.5% aqueous solution of sodium hydroxide is applied at a rate of 0.92 lbs. of the solution per one pound of meal feed that a pH of approximately 10.5 will be obtained.

The jacket temperature for the blender is maintained at approximately 160° F. and the sodium hydroxide processed meal is retained within the blender for approximately ten to thirty minutes.

The meal is then conveyed to a second blender of the same type where it is sprayed with 130 volume hydrogen peroxide to obtain a pH of approximately 7.0 to 8.5. A spray of 130 volume hydrogen peroxide at the rate of approximately 0.05 to 0.18 pound of hydrogen peroxide per pound of wet material feed from the previous operation will obtain the requisite pH of 7.0 to 8.5. The temperature within the hydrogen peroxide treating blender is maintained at between 160 to 190° F. The hydrogen peroxide treated meal is maintained within the blender at between 160 and 190° F. for approximately ten to thirty minutes.

The meal may then be dried by the use of a rotary, tray, or similar type of drier to approximately 7% moisture content or may be passed directly for treatment for other purposes without drying. In the resultant product the free and bound gossypol has been eliminated and has a lighter color and protein injectability than non-treated material.

If after the sodium hydroxide treatment the meal or meats are treated with hydrochloric acid it has been found that a product will be obtained which is substantially absent of free gossypol and having a small reduction of bound gossypol. Such a product has a much more acceptable AGU because of the substantially complete absence of the free gossypol.

In this process the sodium hydroxide treatment is identical to that described above, i.e., the meal is treated by a 2.5% solution of sodium hydroxide to obtain a pH of approximately 10.5 in a blender at 160° F. for ten to thirty minutes.

After the sodium hydroxide treatment the meal is conveyed to a second blender where it is sprayed with a 3% hydrochloric acid solution to obtain a pH of approximately 7.0 to 8.5. The spraying of the 3% hydrochloric acid solution in the ratio of 0.166 pound of 3% acid per pound of meal has been found to result in the reduction of pH to 7.0 to 8.5. The temperature in the blender is maintained at 160° to 180° F. for approximately ten to thirty minutes after the hydrochloric acid treatment. The resultant meal may then either be dried or then treated for other purposes without the intermediate drying step.

The resultant product is found to be substantially in absence of free gossypol and there is also a small reduction of the bound gossypol.

The examples illustrate methods of practicing the present invention it being understood, however, that the conditions set forth in the examples may be varied as to solution and type of press cake, time and temperature employed.

In the first two examples press cake made from cotton seed which was partially oil expelled by screw pressing and finally hexane extracted and having had the following composition was used.

|  | Percent |
|---|---|
| Fat | Approximately 1.00 |
| Protein | 46.30 |
| Moisture | 7.63 |
| Crude fibre | Approximately 11.00 |
| Ash | 7.00 |
| AGU (Grau) | Not more than .30 |
| Free gossypol | .019 |
| Total gossypol | 1.00 |

*Example I*

20 ml. of water was added to 25 grams of the cotton seed meal to make a more workable cake. 3.075 ml. of 19% sodium hydroxide was added to the press cake while continuously stirring until a pH of 10.9 was reached. The mixture was then heated to 160° F. for one-half hour with stirring. Thereafter 9.35 ml. of 130 volume hydrogen peroxide was added to the cake wherein the temperature was elevated to 190° F. and held for fifteen minutes with continuous stirring. The final pH of this mixture was 7.62. The mixture after being dried in an oven at 160° F. was found to have the following analysis: no free or combined gossypol. Prior to the peroxide treatment but after the alkali treatment the material was found to have 0.012% free gossypol and a total gossypol content of 0.78%.

*Example II*

20 ml. of water was added to 25 grams of the cotton seed meal. 3.075 ml. of 19% sodium hydroxide was added to the meal and the material heated to 160° F. where the temperature was held for thirty minutes with continuous stirring. Thereafter 8 ml. of 3% hydrochloric acid was added to the material to provide a pH of 7.1. Thereafter the material was dried in an oven at 160° F. wherein the final analysis of the dried cake showed 0.002% free gossypol and a total gossypol content of 0.67%. Prior to the hydrochloric acid treatment but after the alkali treatment the material showed a free gossypol content of 0.012% and a total gossypol content of 0.78%.

In the following two examples, i.e., Examples 3 and 4, cotton seed meats were used which had been delintered, bar hulled and crushed. A minus 16 mesh fraction was used in the examples and the composition of the meats was as follows:

|  | Percent |
|---|---|
| Fat | 26.86 |
| Protein | 35.2 |
| Moisture | 6.49 |
| Free gossypol | 0.132 |
| Total gossypol | 0.47 |

*Example III*

20 ml. of water was mixed with 25 grams of the bar hulled meats. To this material was added 3.075 mls. of 19% sodium hydroxide solution to obtain a resultant pH of 12.3. The material was heated and mixed at a temperature of 160° F. and held at that temperature for one-half hour. The final pH after heating was 11.35. Subsequently 9.35 mls. of 130 volume hydrogen peroxide was added to the material while the material was heated to 160° F. whereinafter the material was retained at 160° F. for an additional one-half hour. The final pH was 9.15. The mixture was dried at 160° F. wherein the dried product was shown to have no gossypol.

*Example IV*

To 25 grams of bar hulled cotton seed oil 20 mls. of water was added. Thereafter 3.075 mls. of 19% sodium hydroxide solution was added to the material during continuous stirring wherein a pH of 12.2 was obtained. The material was heated to 160° F. and held at that temperature for one-half hour while continuously stirring the material. The pH after the one-half hour period was found to be 11.0. Thereafter 8 mls. of 3% hydrochloric acid was added to the material while heated at 160° F. The material was then held at the 160° F. temperature for one-half hour. The final pH of the mixture was 8.15. The material was then dried at 160° F. wherein the material was found to have a free gossypol content of 0.035% and a total gossypol content of 0.53%.

It is noted that the reduction of gossypol in the various examples especially the bound gossypol, as indicated by the total gossypol test, is not as effective when the meats contain their full complement of fats and oils. The processes described are more efficient when a portion or all of the fat has been removed by one of the various normally used processes. However, in general, the same trend exists for the reduction of free gossypol in both full fat meats as well as in meats which have been fat reduced. It is also noted that the treatment by the sodium hydroxide creates a substantial reduction in both the free and total gossypol content and that a subsequent treatment after the sodium hydroxide treatment by an acid provides a final product which is suitable for feed to non-ruminant animals.

For the purpose of claim terminology the words "seed" and "seed meats" are intended to include both the seeds and the press cakes or seed meats from which the oil has been removed in that the process is equally suitable for processing both the raw seeds and the press cakes.

While the invention has been described for purposes of understanding by reference to examples it is to be understood that various modifications in the process and practice thereof may be desirable. Therefore this application contemplates all modifications within the scope of the appended claims.

What is claimed:

1. A method for treating oleaginous seeds to remove the toxic effect of gossypol from the seed meat including the steps of heating the seed meat in aqueous sodium hydroxide at a pH above 10 at a temperature of about 160° F.–190° F., and then treating the seed meat with sufficient hydrogen peroxide to reduce the pH thereof to approximately 7.0–8.5 by heating the seed meat with the hydrogen peroxide at about 160° F.–190° F. so as to substantially eliminate the gossypol content from the seed meat.

2. A method for treating oleaginous seeds to remove the toxic effect of gossypol from the seed meat including the steps of heating the seed meat in aqueous sodium hydroxide at a pH above 10 at a temperature of about 160° F.–190° F., and then treating the seed meat with sufficient hydrochloric acid to reduce the pH thereof to approximately 7.0–8.5 by heating the seed meat with the hydrochloric acid at about 160° F.–190° F. so as to substantially reduce the gossypol content of the seed meat.

References Cited in the file of this patent

UNITED STATES PATENTS

| 2,726,155 | King | Dec. 6, 1955 |
| 2,797,997 | Eagle | July 2, 1957 |
| 2,873,190 | King | Feb. 10, 1959 |